(12) United States Patent
Jahns et al.

(10) Patent No.: US 7,504,754 B2
(45) Date of Patent: Mar. 17, 2009

(54) ROTOR HAVING MULTIPLE PERMANENT-MAGNET PIECES IN A CAVITY

(75) Inventors: Thomas Merlin Jahns, Madison, WI (US); Mustafa K. Guven, Dunlap, IL (US); Metin Aydin, Peoria, IL (US); Ayman Mohamed Fawzi EL-Refaie, Madison, WI (US); Seok Hee Han, Madison, WI (US); Jeihoon Baek, Madison, WI (US)

(73) Assignees: Caterpillar Inc., Peoria, IL (US); Wisconsin Alumni Research Foundation, Madison, WI (US)

( * ) Notice: Subject to any disclaimer, the term of this patent is extended or adjusted under 35 U.S.C. 154(b) by 43 days.

(21) Appl. No.: 11/261,771

(22) Filed: Oct. 31, 2005

(65) Prior Publication Data

US 2007/0096578 A1    May 3, 2007

(51) Int. Cl.
*H02K 1/27* (2006.01)
(52) U.S. Cl. .................................. 310/156.53
(58) Field of Classification Search ...............................
310/156.38–156.57
See application file for complete search history.

(56) References Cited

U.S. PATENT DOCUMENTS

| 3,696,260 | A |   | 10/1972 | Lace |  |
|---|---|---|---|---|---|
| 3,721,844 | A |   | 3/1973 | Fong |  |
| 3,840,763 | A | * | 10/1974 | Baumann et al. | 310/156.56 |
| 3,979,821 | A |   | 9/1976 | Noodleman |  |
| 4,110,718 | A | * | 8/1978 | Odor et al. | 335/296 |
| 4,139,790 | A |   | 2/1979 | Steen |  |
| 4,237,397 | A | * | 12/1980 | Mohr et al. | 310/154.26 |
| 4,308,479 | A |   | 12/1981 | Richter |  |
| 4,469,970 | A |   | 9/1984 | Neumann |  |
| 4,472,651 | A |   | 9/1984 | Jones |  |
| 4,506,181 | A |   | 3/1985 | Jones et al. |  |

(Continued)

FOREIGN PATENT DOCUMENTS

DE    40 33 454 A1    4/1992

(Continued)

OTHER PUBLICATIONS

International Search Report and Written Opinion Mailed by European Patent Office on Apr. 4, 2007.

(Continued)

*Primary Examiner*—Tran N Nguyen
(74) *Attorney, Agent, or Firm*—Finnegan, Henderson, Farabow, Garrett & Dunner

(57) ABSTRACT

A rotor for an electric machine includes a rotor core constructed of magnetically-permeable material. The rotor core may include a first cavity having a first curved end portion and a second cavity having a first curved end portion disposed adjacent the first curved end portion of the first cavity. The rotor may also include a permanent-magnet cluster. The permanent-magnet cluster may include a permanent-magnet layer that substantially magnetically isolates a portion of the rotor core disposed inside the permanent-magnet cluster from portions of the rotor core disposed outside the permanent-magnet cluster. The permanent-magnet layer may include one or more permanent-magnet pieces disposed in the first cavity and one or more permanent-magnet pieces disposed in the second cavity.

22 Claims, 5 Drawing Sheets

U.S. PATENT DOCUMENTS

| | | |
|---|---|---|
| 4,510,680 A | 4/1985 | Miller et al. |
| 4,525,925 A | 7/1985 | Jones |
| 4,658,165 A | 4/1987 | Vanderschaeghe |
| 4,687,608 A * | 8/1987 | Eino ............................. 427/130 |
| 4,692,646 A | 9/1987 | Gotou |
| 4,727,273 A * | 2/1988 | Tanaka .................. 310/154.29 |
| 4,916,346 A | 4/1990 | Kliman |
| 4,918,831 A | 4/1990 | Kliman |
| 4,924,130 A | 5/1990 | Fratta |
| 5,091,668 A | 2/1992 | Cuenot et al. |
| 5,095,238 A * | 3/1992 | Suzuki et al. .......... 310/156.46 |
| 5,097,166 A | 3/1992 | Mikulic |
| 5,117,553 A | 6/1992 | Kliman |
| 5,159,220 A | 10/1992 | Kliman |
| 5,187,401 A | 2/1993 | Rahman |
| 5,191,256 A | 3/1993 | Reither, Jr. et al. |
| 5,331,245 A | 7/1994 | Burgbacher et al. |
| 5,418,416 A | 5/1995 | Müller |
| 5,500,994 A | 3/1996 | Itaya |
| 5,510,662 A | 4/1996 | Tanimoto et al. |
| 5,554,900 A | 9/1996 | Pop, Sr. |
| 5,627,423 A | 5/1997 | Marioni |
| 5,663,605 A | 9/1997 | Evans et al. |
| 5,684,352 A * | 11/1997 | Mita et al. ............. 310/156.56 |
| 5,796,200 A * | 8/1998 | Sakashita et al. ....... 310/156.05 |
| 5,818,140 A | 10/1998 | Vagati |
| 5,841,212 A * | 11/1998 | Mita et al. ............. 310/156.56 |
| 5,898,253 A | 4/1999 | El-Antably et al. |
| 5,945,758 A | 8/1999 | Goltz et al. |
| 5,945,760 A | 8/1999 | Honda et al. |
| 6,008,559 A | 12/1999 | Asano et al. |
| 6,034,458 A | 3/2000 | Uetake et al. |
| 6,047,461 A * | 4/2000 | Miura et al. ................... 29/598 |
| 6,066,904 A | 5/2000 | Fei et al. |
| 6,072,256 A | 6/2000 | Shon et al. |
| 6,084,496 A | 7/2000 | Asano et al. |
| 6,087,751 A * | 7/2000 | Sakai ..................... 310/156.45 |
| 6,087,752 A | 7/2000 | Kim et al. |
| 6,121,706 A | 9/2000 | Nashiki et al. |
| 6,198,372 B1 | 3/2001 | Schwarz |
| 6,218,753 B1 | 4/2001 | Asano et al. |
| 6,225,724 B1 | 5/2001 | Toide et al. |
| 6,239,526 B1 | 5/2001 | Oh et al. |
| 6,259,181 B1 | 7/2001 | Kawano et al. |
| 6,271,613 B1 | 8/2001 | Akemakou et al. |
| 6,271,616 B1 | 8/2001 | Akemakou |
| 6,285,104 B1 | 9/2001 | Nashiki |
| 6,300,703 B1 | 10/2001 | Kawano et al. |
| 6,313,554 B1 * | 11/2001 | Masuzawa et al. ........ 310/67 R |
| 6,329,734 B1 * | 12/2001 | Takahashi et al. ...... 310/156.56 |
| 6,340,857 B2 * | 1/2002 | Nishiyama et al. ..... 310/156.53 |
| 6,342,745 B1 | 1/2002 | Sakai et al. |
| 6,351,050 B1 | 2/2002 | Coles |
| 6,353,275 B1 | 3/2002 | Nishiyama et al. |
| 6,384,502 B1 * | 5/2002 | Masuzawa et al. .......... 310/152 |
| 6,420,805 B1 * | 7/2002 | Yamaguchi et al. ....... 310/67 R |
| 6,423,386 B2 | 7/2002 | Iwasaki et al. |
| 6,427,534 B2 | 8/2002 | D'Amico et al. |
| 6,448,680 B1 | 9/2002 | Akemakou |
| 6,462,451 B1 | 10/2002 | Kimura et al. |
| 6,486,581 B2 | 11/2002 | Miyashita et al. |
| 6,552,462 B2 | 4/2003 | Sakai et al. |
| 6,555,940 B2 | 4/2003 | Naito et al. |
| 6,597,079 B2 | 7/2003 | Miyashita et al. |
| 6,630,762 B2 | 10/2003 | Naito et al. |
| 6,664,688 B2 | 12/2003 | Naito et al. |
| 6,674,205 B2 | 1/2004 | Biais et al. |
| 6,675,460 B2 | 1/2004 | Reiter, Jr. et al. |
| 6,700,247 B2 * | 3/2004 | Masuzawa et al. ............. 310/80 |
| 6,703,743 B2 * | 3/2004 | Kaneko et al. ......... 310/156.38 |
| 6,713,926 B2 | 3/2004 | Wauke |
| 6,741,002 B2 | 5/2004 | Nishiyama et al. |
| 6,741,003 B2 * | 5/2004 | Naito et al. ............ 310/156.53 |
| 6,794,784 B2 * | 9/2004 | Takahashi et al. ...... 310/156.56 |
| 6,847,144 B1 * | 1/2005 | Luo ...................... 310/156.49 |
| 6,849,981 B2 * | 2/2005 | Kojima et al. .......... 310/156.43 |
| 6,849,983 B2 | 2/2005 | Tajima et al. |
| 6,884,513 B2 | 4/2005 | Kikugawa et al. |
| 6,891,298 B2 | 5/2005 | Gary |
| 6,906,444 B2 * | 6/2005 | Hattori et al. .......... 310/156.53 |
| 6,940,196 B2 | 9/2005 | Gysin |
| 6,946,766 B2 * | 9/2005 | Gary et al. ............. 310/156.53 |
| 6,987,341 B2 * | 1/2006 | Chang et al. ........... 310/156.45 |
| 7,098,569 B2 * | 8/2006 | Ong et al. ..................... 310/261 |
| 2001/0028201 A1 | 10/2001 | Miyshita et al. |
| 2001/0043020 A1 | 11/2001 | Nishiyama et al. |
| 2002/0041127 A1 | 4/2002 | Naito et al. |
| 2002/0041128 A1 | 4/2002 | Nishiyama et al. |
| 2002/0047409 A1 | 4/2002 | Hiroyuki et al. |
| 2002/0047432 A1 | 4/2002 | Miyashita et al. |
| 2002/0117923 A1 | 8/2002 | Takei |
| 2003/0052561 A1 | 3/2003 | Rahman et al. |
| 2003/0062790 A1 | 4/2003 | Reiter, Jr. et al. |
| 2003/0164655 A1 | 9/2003 | Biais et al. |
| 2003/0168925 A1 | 9/2003 | Bernreuther et al. |
| 2003/0209950 A1 | 11/2003 | Biais et al. |
| 2003/0214194 A1 | 11/2003 | Carl, Jr. et al. |
| 2004/0017123 A1 | 1/2004 | Miyashita et al. |
| 2004/0145263 A1 | 7/2004 | Kojima et al. |
| 2004/0251759 A1 | 12/2004 | Hirzel |
| 2005/0140236 A1* | 6/2005 | Jeong et al. ............ 310/156.53 |

FOREIGN PATENT DOCUMENTS

| | | |
|---|---|---|
| EP | 0 678 967 A1 | 10/1995 |
| EP | 0 809 343 B1 | 11/1997 |
| EP | 0 905 858 A1 | 3/1999 |
| EP | 0 909 003 A2 | 4/1999 |
| EP | 0 909 003 A3 | 4/1999 |
| EP | 1 014 542 A2 | 6/2000 |
| EP | 1 014 542 A3 | 6/2000 |
| EP | 1 028 047 A2 | 8/2000 |
| EP | 1 123 576 B1 | 8/2001 |
| EP | 1 139 548 A2 | 10/2001 |
| EP | 1 158 651 A2 | 11/2001 |
| EP | 1 300 208 A2 | 4/2003 |
| EP | 1 139 548 A3 | 10/2003 |
| JP | 59 175363 | 10/1984 |
| JP | 2000092763 A * | 3/2000 |
| JP | 2002034185 A * | 1/2002 |
| JP | 2002300742 A * | 10/2002 |
| JP | 2004-64887 | 2/2004 |
| JP | 2004215395 A * | 7/2004 |
| JP | 2005-94845 A * | 4/2005 |

OTHER PUBLICATIONS

Machine translation from Japanese Patent Office Website of Japanese publication No. JP 2002-300742, published Oct. 11, 2002.

Machine translation of Japanese publicaiton No. JP 2002-034185, published Jan. 31, 2002.

Machine translation of Japanese publication No. JP 2005-094845, published Apr. 7, 2005.

* cited by examiner

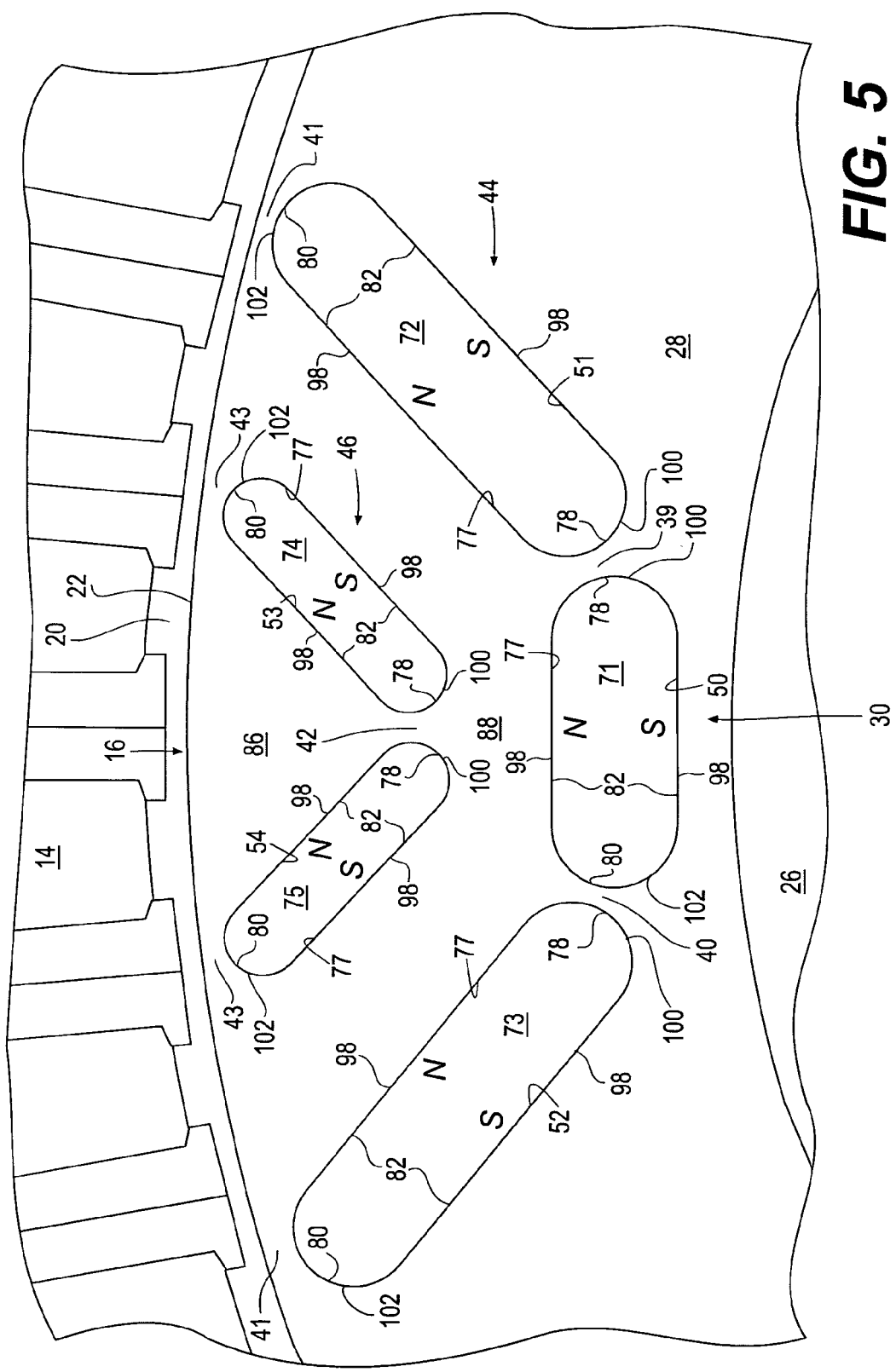

US 7,504,754 B2

ROTOR HAVING MULTIPLE PERMANENT-MAGNET PIECES IN A CAVITY

TECHNICAL FIELD

The present disclosure relates to devices that include permanent-magnets and, more particularly, to electric machines having rotors that include permanent magnets.

BACKGROUND

Many devices include permanent magnets. For example, some electric machines, such as electric motors and electric generators, include a permanent-magnet type rotor that includes permanent magnets. Many permanent-magnet type rotors have a rotor body with permanent magnets attached to an outer surface of the rotor body by adhesive bonds. Such adhesive bonds have limited strength and may fail and allow the permanent magnets to detach from the rotor body under some circumstances, such as during high-speed rotation of the rotor.

U.S. Pat. No. 6,087,751 to Sakai ("the '751 patent") shows a reluctance type rotating electric machine having a rotor that includes permanent magnets mounted inside cavities in the rotor. The rotor of the '751 patent includes a rotor core constructed of laminated steel plates. The rotor core includes a plurality of cavities. The permanent magnets are contained in the cavities of the rotor core.

Although the rotor of the '751 patent includes permanent magnets mounted in cavities of the rotor core, certain disadvantages persist. For example, each of the cavities has a perimeter that is composed of substantially straight portions and sharp corner portions between the substantially straight portions. The sharp corner portions of the perimeters of these cavities may create large stress concentrations in the rotor core. Such large stress concentrations in the rotor core may adversely affect the durability of the rotor core.

The cavities, permanent-magnet pieces, rotor, and electric machine of the present disclosure solve one or more of the problems set forth above.

SUMMARY OF THE INVENTION

One disclosed embodiment relates to a rotor for an electric machine. The rotor may include a rotor core constructed of magnetically-permeable material. The rotor core may include a first cavity having a first curved end portion and a second cavity having a first curved end portion disposed adjacent the first curved end portion of the first cavity. The rotor may also include a permanent-magnet cluster. The permanent-magnet cluster may include a permanent-magnet layer that substantially magnetically isolates a portion of the rotor core disposed inside the permanent-magnet cluster from portions of the rotor core disposed outside the permanent-magnet cluster. The permanent-magnet layer may include one or more permanent-magnet pieces disposed in the first cavity and one or more permanent-magnet pieces disposed in the second cavity.

Another embodiment relates to a rotor for an electric machine. The rotor may include a rotor core constructed of magnetically-permeable material and having a first cavity. The rotor may also include a plurality of permanent-magnet pieces disposed in the first cavity. The plurality of permanent-magnet pieces disposed in the first cavity may include a first permanent-magnet piece and a second permanent-magnet piece. The first permanent-magnet piece may be a first type of magnet material having a perimeter with a first shape. The second permanent-magnet piece may be a second type of magnet material having a perimeter with a second shape. The perimeter of the second permanent-magnet piece may include a curved portion.

A further disclosed embodiment relates to an assembly. The assembly may include a structure that includes a cavity. A perimeter of a cross-section of the cavity may include one or more straight portions and one or more curved portions. The assembly may also include a plurality of permanent-magnet pieces having surfaces that extend substantially contiguous with each portion of the perimeter of the cross-section of the cavity. The plurality of permanent-magnet pieces may include one or more permanent-magnet pieces constructed of a first type of magnet material and having one or more substantially straight surfaces extending substantially contiguous with one or more of the substantially straight portions of the perimeter of the cavity. The plurality of permanent-magnet pieces may also include one or more permanent-magnet pieces constructed of a second type of magnet material and having curved surfaces disposed contiguous with each of the one or more of the curved portions of the perimeter of the cavity.

Another disclosed embodiment relates to a rotor for an electric machine. The rotor may include a rotor core constructed of magnetically-permeable material. The rotor core may include a first cavity having a first end and a second end. The rotor core may also include a second cavity having a first end disposed adjacent the first end of the first cavity. Additionally, the rotor core may include a third cavity having a first end disposed adjacent the second end of the first cavity. From their first ends, the second and third cavities may extend away from one another, as they extend toward an outer perimeter of the rotor. The rotor core may also include a fourth cavity disposed between the second cavity and the third cavity. Additionally, the rotor core may include a fifth cavity disposed between the second cavity and the third cavity and having a first end disposed adjacent a first end of the fourth cavity. From their first ends, the fourth and fifth cavities extend away from one another, as they extend toward the outer perimeter of the rotor. Additionally, the rotor may include a plurality of permanent-magnet pieces. The plurality of permanent-magnet pieces may include one or more permanent-magnet pieces disposed in each of the first, second, third, fourth, and fifth cavities.

BRIEF DESCRIPTION OF THE DRAWINGS

FIG. 5 is an illustration of a third embodiment of the components shown in FIG. 2.

DETAILED DESCRIPTION

Figure 1:
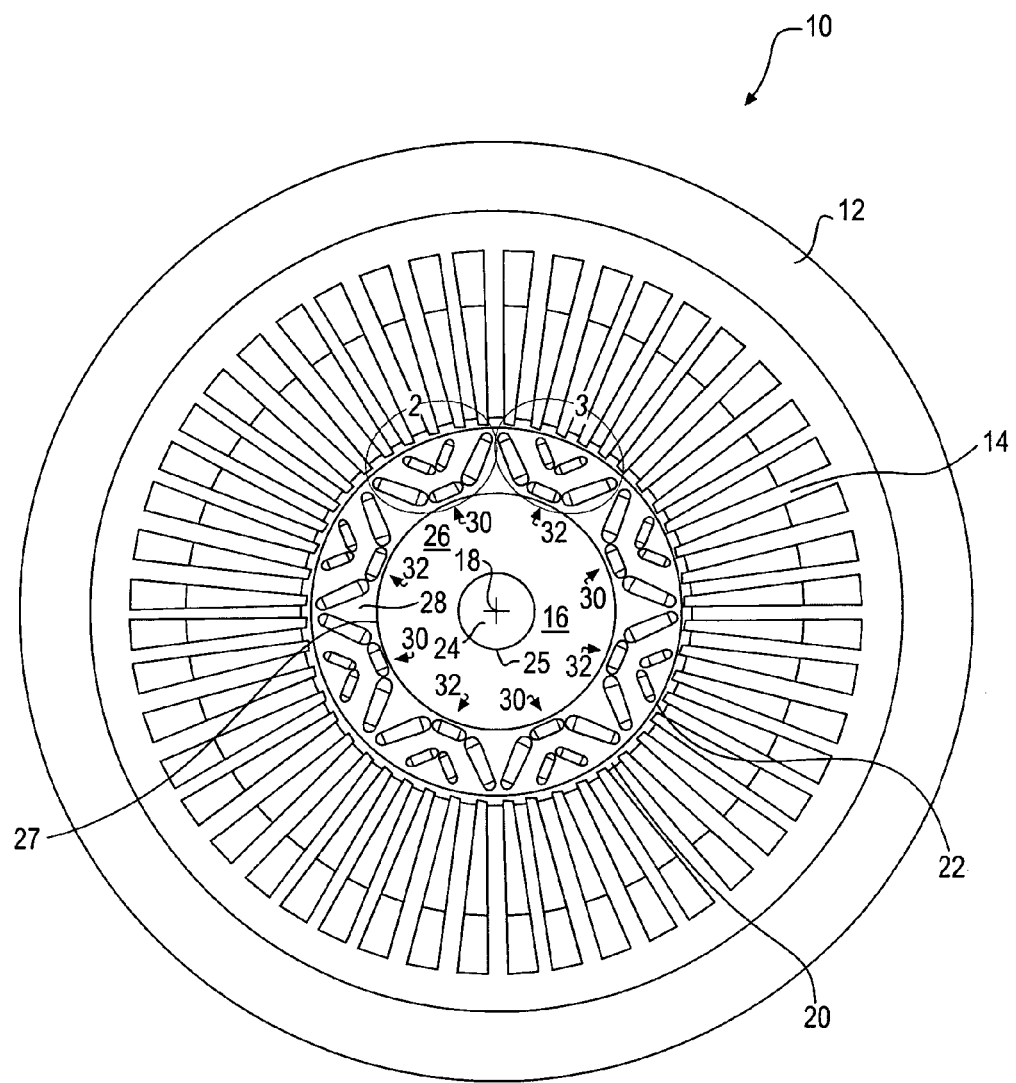
FIG. 1 is a sectional illustration of one embodiment of an electric machine according to the present disclosure.

FIG. 1 illustrates one embodiment of an electric machine 10 according to the present disclosure. Electric machine 10 may be configured to operate as an electric motor and/or an electric generator. Electric machine 10 may include a housing 12, a stator 14, and a rotor 16.

Housing 12 may provide support for stator 14 and rotor 16. Rotor 16 may be supported by housing 12 in such a manner that rotor 16 may rotate about a rotor rotation axis 18. Housing 12 may support stator 14 in a stationary position adjacent rotor 16. As FIG. 1 shows, in some embodiments, stator 14 may extend around rotor rotation axis 18 and rotor 16, with an annular air gap 20 between stator 14 and an outer perimeter 22 of rotor 16.

Stator 14 may include windings of an electrical conductor (not shown), such as wire. Such windings of an electrical conductor may be operable to receive electricity from an electrical power source to produce a rotating magnetic field adjacent rotor 16.

Rotor 16 may include a rotor shaft 24, a rotor hub 26, and a rotor core 28. Rotor hub 26 may be constructed of a material with a relatively low permeability to magnetic flux. Rotor hub 26 may extend around and be fixedly attached to rotor shaft 24 at a shaft/hub interface 25. Rotor core 28 may be constructed of a material having a relatively high permeability to magnetic flux, such as a ferrous metal. Rotor core 28 may extend around and be fixedly attached to rotor hub 26 at a hub/core interface 27.

Rotor 16 may also include permanent-magnet pieces mounted to rotor core 28, some or all of which may be arranged in permanent-magnet clusters 30, 32. Permanent-magnet clusters 30 and permanent-magnet clusters 32 may be arranged in alternating positions around outer perimeter 22 of rotor 16. As is described in greater detail below, permanent-magnet clusters 30 may create north magnetic poles of rotor 16, and permanent-magnet clusters 32 may create south magnetic poles of rotor 16.

Figure 2:
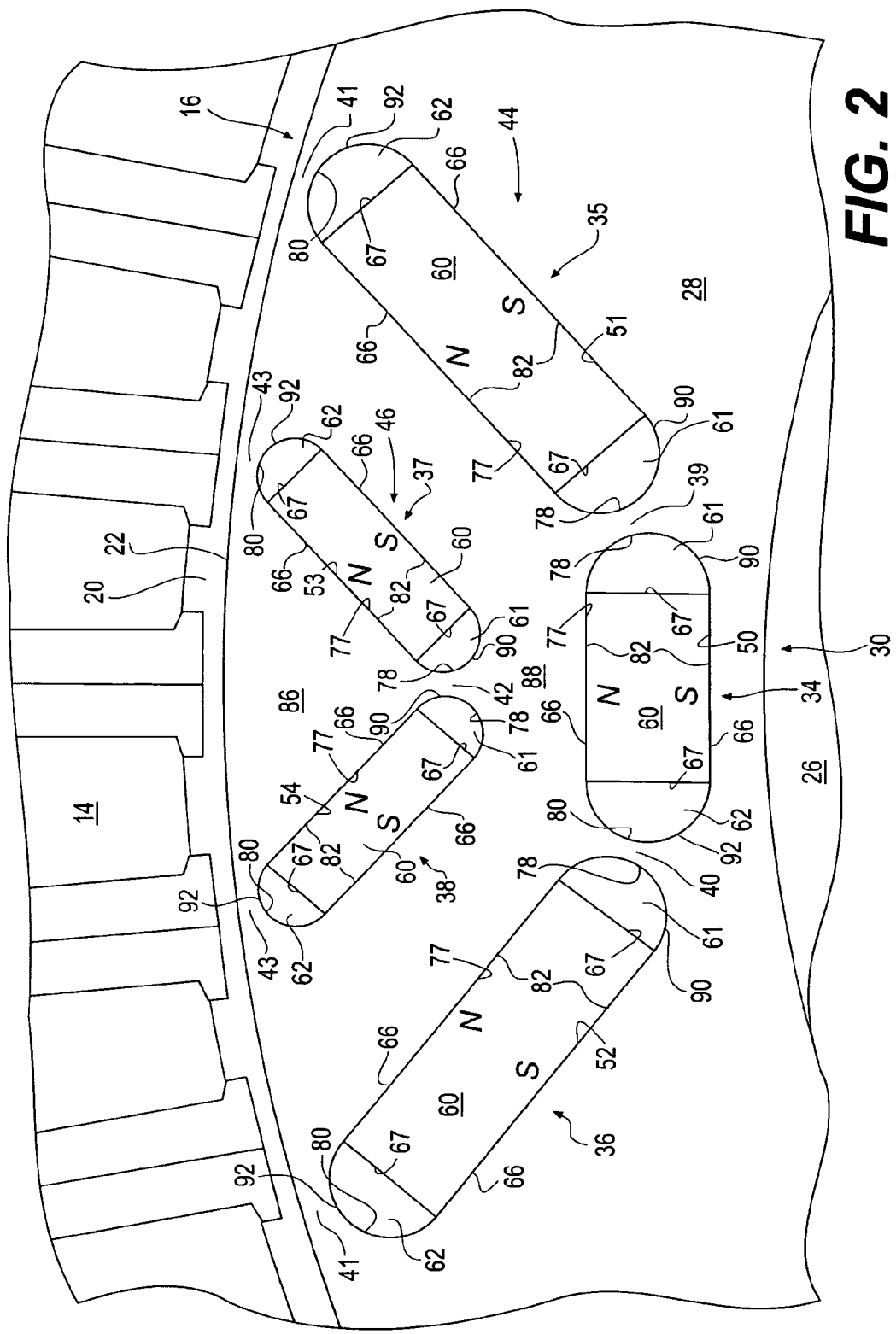
FIG. 2 is an enlarged view of the portion of FIG. 1 shown in circle 2.

FIG. 2 shows a permanent-magnet cluster 30 and the surrounding portions of rotor core 28 in greater detail. Rotor core 28 may include cavities 50-54. The cross-section of each cavity 50-54 shown in FIG. 2 may have a perimeter 77 that includes side portions 82 and curved end portions 78, 80. In some embodiments, curved end portions 78, 80 may have a substantially constant radius of curvature. Additionally, one or more of perimeters 77 of cavities 50-54 may be free of sharp corner portions.

Permanent-magnet cluster 30 may include groups 34-38 of permanent-magnet pieces 60-62 disposed in cavities 50-54. Permanent-magnet pieces 60-62 may be secured within each cavity 50-54 through various means, including, but not limited to, adhesive bonding and interference fit. The permanent-magnet pieces 60-62 of a respective group 34-38 may or may not be fixedly attached to one another through means such as adhesive bonds. Each permanent-magnet piece 60 may be a first type of magnet material, such as sintered magnet material, and each permanent-magnet piece 61, 62 may be a second type of magnet material, such as bonded magnet material. The permanent-magnet pieces 60-62 of a respective group 34-38 may be magnetized in generally the same direction, such that the permanent-magnet pieces 60-62 collectively create a north magnetic pole (N) and a south magnetic pole (S) of that group 34-38.

In some embodiments, the permanent-magnet pieces 60-62 of a respective group 34-38 may have surfaces that extend substantially contiguous to each portion of the perimeter 77 of the cross-section of their host cavity 50-54 shown in FIG. 2. For example, in a respective cavity 50-54, permanent-magnet piece 60 may include sides 66 that extend substantially contiguous with side portions 82 of perimeter 77, and permanent-magnet pieces 61, 62 may have curved surfaces 90, 92 that extend substantially contiguous with curved end portions 78, 80, respectively, of perimeter 77. Additionally, in some embodiments, one or more of permanent-magnet pieces 60 may have a perimeter composed of substantially straight surfaces. For example, one or more of permanent-magnet pieces 60 may be constructed with substantially straight sides 66 and substantially straight ends 67 that extend between sides 66.

Groups 34-38 of permanent-magnet pieces 60-62 may be arranged in multiple radial permanent-magnet layers with respect to rotor rotation axis 18. An outer radial permanent-magnet layer 46 of permanent-magnet cluster 30 may include groups 37 and 38 of permanent-magnet pieces 60-62. Curved end portions 78 of cavities 53, 54 and permanent-magnet pieces 61 of groups 37, 38 may be disposed adjacent one another, with a portion 42 of rotor core 28 disposed therebetween. From curved end portions 78 and permanent-magnet pieces 61, cavities 53, 54 and groups 37, 38 of permanent-magnet pieces 60-62 may extend away from one another as they extend toward outer perimeter 22 of rotor 16. Curved end portions 80 of cavities 53, 54 and permanent-magnet pieces 62 of groups 37, 38 may be disposed adjacent outer perimeter 22 of rotor 16. Portions 43 of rotor core 28 may be disposed between outer perimeter 22 of rotor 16 and curved end portions 80 of cavities 53, 54.

An inner radial permanent-magnet layer 44 of permanent-magnet cluster 30 may include groups 34, 35, 36 of permanent-magnet pieces 60-62. Cavity 50 and group 34 of permanent-magnet pieces 60-62 may extend substantially parallel to outer perimeter 22 of rotor 16. Curved end portion 78 of cavity 51 and permanent-magnet piece 61 of group 35 may be disposed adjacent curved end portion 78 of cavity 50 and permanent-magnet piece 61 of group 34, with a portion 39 of rotor core 28 disposed therebetween. Similarly, curved end portion 78 of cavity 52 and permanent-magnet piece 61 of group 36 may be disposed adjacent curved end portion 80 of cavity 50 and permanent-magnet piece 62 of group 34, with a portion 40 of rotor core 28 disposed therebetween. From adjacent curved end portions 78, 80 of cavity 50, cavities 51, 52 and groups 35, 36 of permanent-magnet pieces 60-62 may extend away from one another as they extend toward outer perimeter 22 of rotor 16. Curved end portions 80 of cavities 51, 52 and permanent-magnet pieces 62 of groups 35, 36 may be disposed adjacent outer perimeter 22 of rotor 16. Portions 41 of rotor core 28 may be disposed between outer perimeter 22 and curved end portions 78, 80 of cavities 51, 52.

As was mentioned above, permanent-magnet cluster 30 may create a north magnetic pole of rotor 16. Groups 34-38 of permanent-magnet pieces 60-62 may have their north magnetic poles directed generally toward outer perimeter 22 of rotor 16. Additionally, inner radial permanent-magnet layer 44 may create a barrier to magnetic flux that substantially magnetically isolates portions 86, 88 of rotor core 28 disposed inside permanent-magnet cluster 30 from portions of rotor core 28 disposed outside permanent-magnet cluster 30. Because permanent-magnet pieces 60-62 have a low permeability to magnetic flux, groups 34-36 of permanent-magnet pieces 60-62 greatly impede magnetic flux from flowing across them to enter or exit portions 86, 88 of rotor core 28. Additionally, portions 39-41 of rotor core 28 may be sufficiently narrow that magnetic flux from groups 34-36 of permanent-magnet pieces 60-62 may saturate portions 39-41 of rotor core 28. When they are saturated with magnetic flux, portions 39-41 of rotor core 28 may also have a low permeability to magnetic flux and, therefore, greatly impede magnetic flux from flowing through them to enter or exit portions 86, 88 of rotor core 28. As a result, very little of the magnetic flux generated by the north magnetic poles of groups 34-38 of permanent-magnet pieces 60-62 may leave permanent-magnet cluster 30 by flowing through portions 39-42 of rotor core 28. So, nearly all of the magnetic flux generated by the north magnetic poles of groups 34-38 may be forced to leave permanent-magnet cluster 30 by flowing substantially radially across air gap 20, into stator 14.

Additionally, permanent-magnet cluster 30 may be configured in a manner to ensure that most all of the magnetic flux generated by the north magnetic poles of outer radial permanent-magnet layer 46 flows across air gap 20. Similar to inner radial permanent-magnet layer 44, outer radial permanent-magnet layer 46 may substantially magnetically isolate portion 88 of rotor core 28 from portion 86 of rotor core 28 and also from portions of rotor core 28 disposed outside of permanent-magnet cluster 30. This may force nearly all of the magnetic flux from the north magnetic poles of outer-radial permanent-magnet layer 46 to flow across air gap 20.

Figure 3:
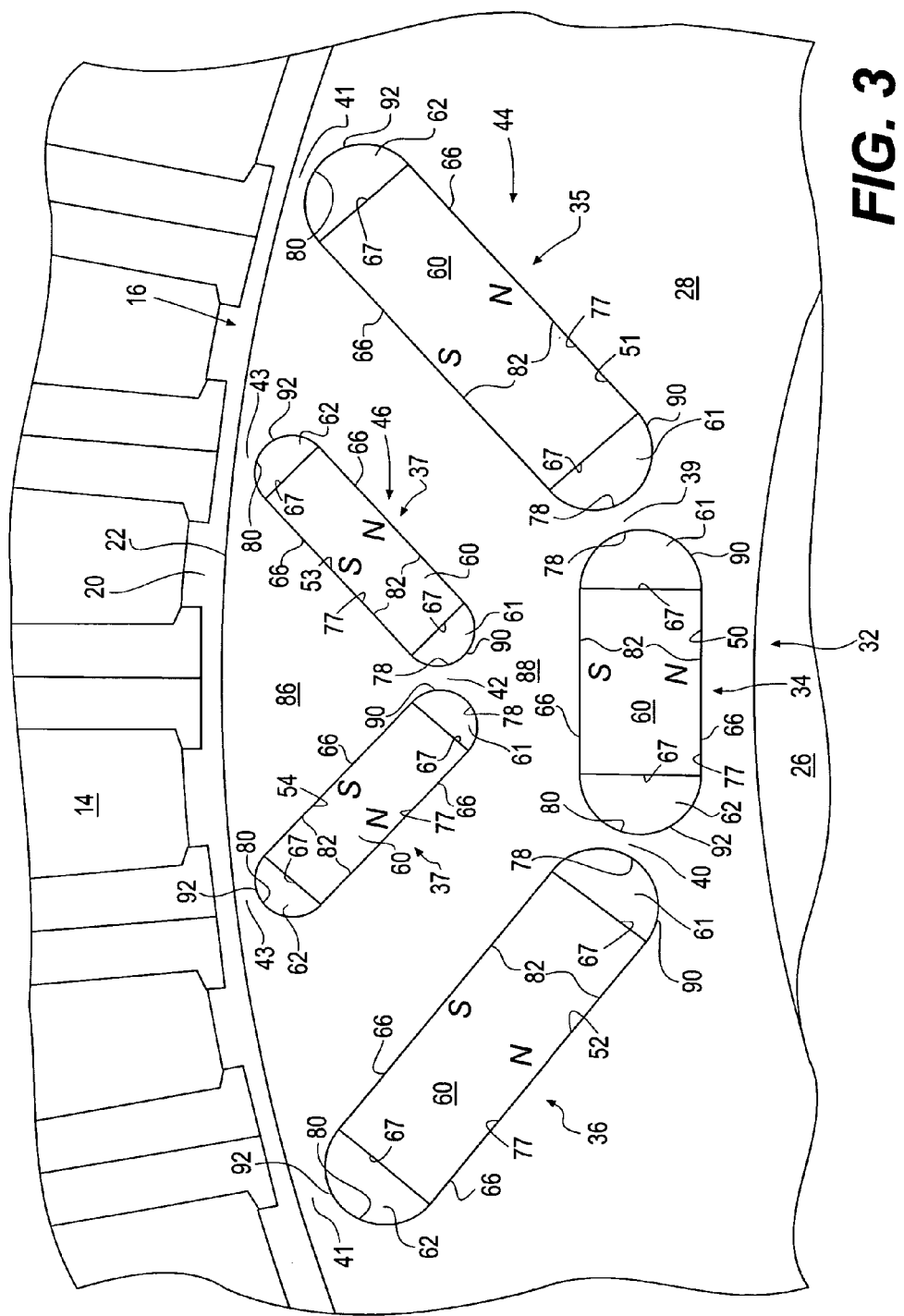
FIG. 3 is an enlarged view of the portion of FIG. 1 shown in circle 3.

FIG. 3 shows a permanent-magnet cluster 32 in more detail. In most respects, the embodiment of permanent-magnet cluster 32 shown in FIG. 3 is substantially the same as permanent-magnet cluster 30. However, in permanent-magnet cluster 32, groups 34-38 of permanent-magnet pieces 60-62 may have their south magnetic poles, rather than their north magnetic poles, generally facing outer perimeter 22 of rotor 16. Accordingly, permanent-magnet cluster 32 may form a south magnetic pole of rotor 16. As with permanent-magnet cluster 30, inner radial permanent-magnet layer 44 may substantially magnetically isolate portions 86, 88 of rotor core 28 from portions of rotor core 28 disposed outside permanent-magnet cluster 32. Additionally, outer radial permanent-magnet layer may substantially magnetically isolate portion 88 of rotor core 28 from portion 86 of rotor core 28 and also from portions of rotor core 28 disposed outside permanent-magnet cluster 32.

Figure 4:
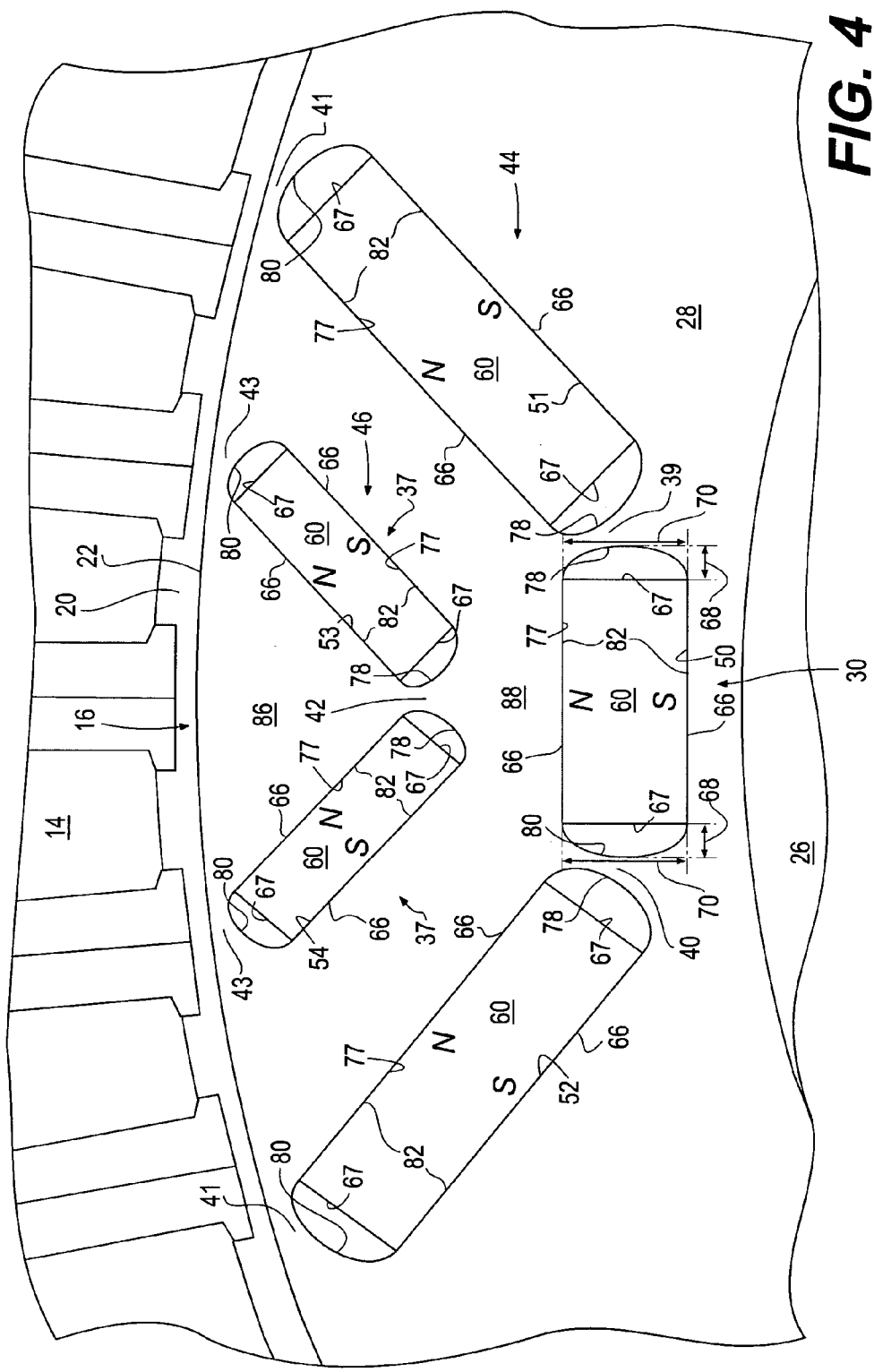
FIG. 4 is an illustration of a second embodiment of the components shown in FIG. 2.

FIG. 4 shows another embodiment of permanent-magnet cluster 30. In the embodiment shown in FIG. 4, permanent-magnet cluster 30 includes only permanent-magnet pieces 60 disposed in cavities 50-54, such that cavities 50-54 are vacant inside curved end portions 78, 80. Additionally, cavities 50-54 have different shapes in the embodiment shown in FIG. 4 than in the embodiment shown in FIG. 2. In the embodiment shown in FIG. 4, each curved end portion 78, 80 of cavities 50-54 may have a width 70 and a depth 68 that is less than its width 70. In some embodiments, curved end portions 78, 80 may be elliptical.

Like the embodiment of permanent-magnet cluster 30 shown in FIG. 2, the embodiment of permanent-magnet cluster 30 shown in FIG. 4 includes outer radial permanent-magnet layer 46 and inner radial permanent-magnet layer 44. Permanent-magnet pieces 60 disposed in cavities 53, 54 may form outer radial permanent-magnet layer 46, and permanent-magnet pieces 60 disposed in cavities 50-52 form inner radial permanent-magnet layer 44. Permanent-magnet pieces 60 of inner radial permanent-magnet layer 44 have a relatively low permeability to magnetic flux and may, therefore, present a barrier to magnetic flux. Additionally, permanent-magnet pieces 60 may saturate portions 39-41 of rotor core 28 with magnetic flux, such that they also have a relatively low permeability to magnetic flux. Additionally, air inside curved end portions 78, 80 of cavities 50-52 has a relatively low permeability to magnetic flux, such that only negligible amounts of magnetic flux may flow across curved end portions 78, 80 of cavities 50-52. Accordingly, as in the embodiment shown in FIG. 2, in the embodiment shown in FIG. 4, inner radial permanent-magnet layer 44 may substantially magnetically isolate portions 86, 88 of rotor core 28 from portions of rotor core 28 disposed outside of permanent-magnet cluster 30. Additionally, as in the embodiment shown in FIG. 2, outer radial permanent-magnet layer 46 may substantially magnetically isolate portion 88 of rotor core 28 from portion 86 of rotor core 28 and from portions of rotor core 28 disposed outside permanent-magnet cluster 30.

FIG. 5 shows another embodiment of permanent-magnet cluster 30. The embodiment of permanent-magnet cluster 30 shown in FIG. 5 includes a single permanent-magnet piece 71, 72, 73, 74, 75 disposed in each of cavities 50, 51, 52, 53, 54, respectively. Permanent-magnet pieces 74, 75 may form outer radial permanent-magnet layer 46, and permanent-magnet pieces 71-73 may form inner radial permanent-magnet layer 44. Each permanent-magnet piece 71-75 may have surfaces that extend substantially contiguous to each portion of perimeter 77 of the cross-section of its host cavity 50-54 shown in FIG. 2. For example, each permanent-magnet piece 71-75 may include sides 98 extending substantially contiguous with side portions 82 of perimeters 77, and each permanent-magnet piece 71-75 may include curved ends 100, 102 extending substantially contiguous with curved end portions 78, 80 of perimeters 77. Each of permanent-magnet pieces 71-75 may be sintered magnet material, bonded magnet material, or some other type of magnet material. Additionally, as in the embodiment shown in FIG. 2, inner radial permanent-magnet layer may substantially magnetically isolate portions 86, 88 of rotor core 28 from portions of rotor core 28 disposed outside permanent-magnet cluster 30. Similarly, as in the embodiment shown in FIG. 2, outer radial permanent-magnet layer 46 may substantially magnetically isolate portion 88 of rotor core 28 from portion 86 of rotor core 28 and also from portions of rotor core 28 disposed outside permanent-magnet cluster 30.

Electric machine 10 is not limited to the configurations shown in FIGS. 1-5. For example, rotor 16 may include more or fewer permanent-magnet clusters 30, 32 than shown in FIG. 1. Similarly, the rotor core 28 may have different numbers and/or arrangements of cavities within which the permanent-magnet pieces of one or more of permanent-magnet clusters 30, 32 may be disposed. Additionally, one or more of permanent-magnet clusters 30-32 may include more or fewer radial permanent-magnet layers than are shown in FIGS. 1-5. Furthermore, one or more permanent-magnet pieces may be mounted to an outer surface of rotor core 28. Moreover, one or more of the magnetic poles of rotor 16 may be created by a single permanent-magnet piece.

Additionally, groups 34-38 of permanent-magnet pieces 60-62, permanent magnet pieces 60-62 themselves, permanent-magnet pieces 71-75, and cavities 50-54 are not limited to the configurations shown in FIGS. 1-5. For example, one or more of groups 34-38 may include different numbers and/or shapes of permanent-magnet pieces than shown in FIGS. 1-3. In some embodiments, permanent-magnet clusters 30, 32 may be the same as the configurations shown in FIGS. 1-3, except that portions of cavities 50-54 may be vacant inside their curved end portions 78, 80. Additionally, permanent-magnet pieces 60 may be formed of magnet material other than sintered magnet material, and permanent-magnet pieces 61, 62 may be formed of magnet material other than bonded magnet material. Furthermore, one or more of cavities 50-54 may have different shapes than shown in FIGS. 1-5. For example, while FIGS. 1-5 show cavities 50-54 having sides 82 extending substantially parallel to one another, sides 82 of one or more of cavities 50-54 may be disposed at an angle with respect to one another. Additionally, while FIGS. 1-5 show cavities 50-54 having generally straight, elongated shapes, one or more of cavities 50-54 may have more complicated shapes. Furthermore, while each of FIGS. 1-5 shows each cavity 50-54 having the same shape as each other cavity 50-54, one or more of cavities 50-54 may have different shapes than others of cavities 50-54.

INDUSTRIAL APPLICABILITY

Rotor 16 may have application in any electric machine 10 configured to operate as an electric motor and/or an electric generator. Additionally, the disclosed embodiments of permanent-magnet pieces 60-62, groups 34-38 of permanent-magnet pieces 60-62, permanent-magnet pieces 71-75, and cavities 50-54 may have application in any apparatus including permanent-magnet pieces mounted in cavities.

During operation of electric machine 10 as an electric motor, stator 14 may receive electric current from an electrical power source. For example, stator 14 may receive single-phase or multi-phase alternating current. Current flowing through stator 14 may create a rotating magnetic field around rotor 16.

Simultaneously, magnetic flux from permanent-magnet clusters 30, 32 may flow through stator 14. As is described above in connection with FIG. 2, magnetic flux may flow from each permanent-magnet cluster 30, across air gap 20, into stator 14. This magnetic flux may then flow through stator 14, across air gap 20, into permanent-magnet clusters 32. The magnetic flux created by permanent-magnet clusters 30, 32 and the rotating magnetic field created by stator 14 may interact to apply torque to rotor 16 and, thereby, rotate rotor 16 around rotor rotation axis 18. Rotor shaft 24 may drive any components connected thereto.

The disclosed configurations of permanent-magnet clusters 30, 32 may give electric machine 10 desirable operating characteristics when operated as an electric motor. In embodiments where permanent-magnet clusters 30, 32 each include multiple radial permanent-magnet layers 44, 46, electric machine 10 may have a relatively large constant-power speed range. Additionally, because nearly all magnetic flux flowing from permanent-magnet clusters 30 travels through stator 14 on its way to permanent-magnet clusters 32, electric machine 10 may have a relatively high power output.

Additionally, constructing cavities 50-54 with curved end portions 78, 80 may keep stress concentrations created by cavities 50-54 relatively low, which may provide various structural and/or performance benefits. For example, in some embodiments, rotor core 28 may be better able to withstand high-speed rotation of rotor 16 if cavities 50-54 include curved end portions 78, 80. Rotation of rotor 16 may create centrifugal forces on portions 86, 88 of rotor core 28, which may create stresses in and adjacent portions 39-43 of rotor core 28. Curved end portions 78, 80 of cavities 50-54 may help to keep these stresses low. In some embodiments, stresses created in portions 39-43 of rotor core 28 by rotation of rotor 16 may be a factor that limits the maximum allowable rotating speed of rotor 16. Accordingly, constructing cavities 50-54 with curved end portions 78, 80 may increase the maximum allowable rotating speed of rotor 16.

Furthermore, the disclosed embodiments of permanent-magnet clusters 30, 32 may produce relatively large quantities of magnetic flux, which may also contribute to electric machine 10 having a relatively high power output. Because sintered magnet material generally produces a large quantity of magnetic flux per unit volume of magnet material, utilizing permanent-magnet pieces 60 or 71-75 constructed of sintered magnet material may contribute to permanent-magnet clusters 30, 32 generating large quantities of magnetic flux. Additionally, the quantity of magnetic flux generated by permanent-magnet clusters 30, 32 may be positively correlated to the quantity of magnet material that permanent-magnet clusters 30, 32 include. Furthermore, the more closely permanent-magnet pieces 60-62 or 71-75 conform to perimeters 77 of cavities 50-54, the more magnet material can fit in cavities 50-54 and, thus, the more magnet material permanent-magnet clusters 30, 32 can include. Accordingly, utilizing one or more of permanent-magnet pieces 60-62, 71-75 with surfaces 66, 90, 92, 98, 100, 102 that extend substantially contiguous to portions 78, 80, 82 of perimeters 77 of cavities 50-54 may contribute to permanent-magnet clusters 30, 32 producing large quantities of magnetic flux.

Moreover, the disclosed embodiments allow the above-described advantages to be realized, while keeping manufacturing costs for permanent magnet pieces 60-62 low. Inexpensive methods exist for forming sintered magnet material into permanent-magnet pieces with substantially straight surfaces. Accordingly, sintered magnet material may be inexpensively formed into permanent-magnet pieces 60 with substantially straight sides 66 and substantially straight ends 67, such that permanent-magnet pieces 60 may substantially fill the portions of cavities 50-54 between side portions 82 of perimeters 77. Additionally, pieces of bonded magnet material are manufactured using molding process, which allows forming pieces of bonded magnet material with curved surfaces less expensively than forming pieces of some types of magnet material, such as sintered magnet material, with curved surfaces. Thus, it may be relatively inexpensive to construct permanent-magnet pieces 61, 62 as bonded magnet material having curved surfaces 90, 92, so that permanent-magnet pieces 61, 62 may substantially fill the portions of cavities 50-54 inside curved end portions 78, 80 thereof.

Additionally, making depth 68 of curved end portions 78, 80 of cavities 50-54 relatively small may further contribute to permanent-magnet clusters 30, 32 producing large quantities of magnetic flux, while keeping manufacturing costs for permanent-magnet pieces 60 low. Reducing depth 68 of curved end portions 78, 80 of cavities 50-54 may allow increasing the lengths of side portions 82 of cavities 50-54. Increasing the lengths of side portions 82 of cavities 50-54 may increase the portions of cavities 50-54 that may be filled with relatively inexpensive straight-sided permanent-magnet pieces 60 constructed of sintered magnet material.

Furthermore, the disclosed embodiments may have certain thermal advantages. During operation of electric machine 10, the temperature of permanent-magnet pieces 60 and portions of rotor core 28 around cavities 50-54 may increase. In embodiments where portions of cavities 50-54 inside curved end portions are vacant, air may travel through those vacant portions, which may help cool permanent-magnet pieces 60 and portions of rotor core 28 surrounding cavities. Air may be allowed to travel freely through vacant portions of cavities 50-54, or air may be forced through vacant portions of cavities 50-54, such as by a fan.

It will be apparent to those skilled in the art that various modifications and variations can be made in the disclosed permanent-magnet pieces groups of permanent-magnet pieces, cavities, and rotor without departing from the scope of the disclosure. Other embodiments of the disclosed permanent-magnet pieces, groups of permanent-magnet pieces, permanent-magnet pieces, cavities, and rotor will be apparent to those skilled in the art from consideration of the specification and practice of the permanent-magnet pieces, groups of permanent-magnet pieces, permanent-magnet pieces, cavities, and rotor disclosed herein. It is intended that the specification and examples be considered as exemplary only, with a true scope of the disclosure being indicated by the following claims and their equivalents.

What is claimed is:

1. A rotor for an electric machine, the rotor comprising:
   a rotor core constructed of magnetically-permeable material, the rotor core including a first cavity having a first curved end portion, and a second cavity having a first curved end portion disposed adjacent the first curved end portion of the first cavity;

a third cavity having a first curved end portion disposed adjacent a second curved end portion of the first cavity;

wherein from their first curved end portions, the second and third cavities extend away from one another as they extend toward an outer perimeter of the rotor;

a fourth cavity disposed between the second cavity and the third cavity, a fifth cavity disposed between the second cavity and the third cavity, the fifth cavity having a first end portion disposed adjacent a first end portion of the fourth cavity;

wherein, from their first end portions, the fourth and fifth cavities extend away from one another as they extend toward the outer perimeter of the rotor; and a permanent-magnet cluster, the permanent-magnet cluster including a permanent-magnet layer that substantially magnetically isolates a portion of the rotor core disposed inside the permanent-magnet cluster from portions of the rotor core disposed outside the permanent-magnet cluster, the permanent-magnet layer including a plurality of permanent-magnet pieces disposed in the first cavity, wherein the plurality of permanent-magnet pieces disposed in the first cavity include a first permanent-magnet piece having a perimeter composed of substantially straight surfaces and a second permanent-magnet piece having a curved surface extending substantially contiguous with the first curved end portion of the first cavity, the first permanent-magnet piece being a first type of magnet material and the second permanent-magnet piece being a second type of magnet material, one or more permanent-magnet pieces disposed in the second cavity, one or more permanent-magnet pieces disposed in the third cavity, one or more permanent-magnet pieces disposed in the fourth cavity, and one or more permanent-magnet pieces disposed in the fifth cavity.

2. The rotor of claim 1, wherein:

a second end portion of the second cavity is disposed adjacent the outer perimeter of the rotor; and a second end portion of the third cavity is disposed adjacent the outer perimeter of the rotor.

3. The rotor of claim 1, wherein the first type of magnet material is sintered magnet material.

4. The rotor of claim 1, wherein the second type of magnet material is bonded magnet material.

5. The rotor of claim 1, wherein the first curved end portion of the first cavity has a depth that is less than its width.

6. The rotor of claim 1, wherein the first curved end portion of the first cavity has a substantially constant radius of curvature.

7. The rotor of claim 1, wherein the first curved end portion of the first cavity is elliptical.

8. The rotor of claim 1, wherein:

the plurality of permanent-magnet pieces disposed in the first cavity include surfaces that extend substantially contiguous to each portion of a perimeter of a cross-section of the first cavity; and the one or more permanent-magnet pieces disposed in the second cavity include surfaces that extend substantially contiguous to each portion of a perimeter of a cross-section of the second cavity.

9. The rotor of claim 1, wherein the second cavity is vacant inside its first curved end portion.

10. A rotor for an electric machine, the rotor comprising:

a rotor core constructed of magnetically-permeable material, the rotor core including a first cavity having a first end portion and a second end portion, a second cavity having a first end portion disposed adjacent the first end portion of the first cavity, a third cavity having a first end portion disposed adjacent the second end portion of the first cavity, wherein, from their first end portions, the second and third cavities extend away from one another, as they extend toward an outer perimeter of the rotor, a fourth cavity disposed between the second and third cavities, and a fifth cavity disposed between the second and third cavities, a first end portion of the fifth cavity being disposed adjacent a first end portion of the fourth cavity, wherein, from their first end portions, the fourth and fifth cavities extend away from one another, as they extend toward the outer perimeter of the rotor; and a plurality of permanent-magnet pieces, including one or more. permanent-magnet pieces disposed in each of the first, second, third, fourth, and fifth cavities.

11. The rotor of claim 10, wherein the one or more permanent-magnet pieces disposed in one of the cavities includes a first permanent-magnet piece having a perimeter composed of substantially straight sides, and a second permanent-magnet piece having a perimeter including at least one curved portion.

12. The rotor of claim 11, wherein the second permanent-magnet piece is bonded permanent magnet material.

13. The rotor of claim 12, the first permanent-magnet piece is sintered magnet material.

14. The rotor of claim 10, wherein:

the permanent-magnet pieces disposed in the first, second, third, fourth, and fifth cavities form at least a portion of a permanent-magnet cluster that creates a north magnetic pole of the rotor; and the permanent-magnet pieces disposed in the first, second, and third cavities form a permanent-magnet layer that substantially magnetically isolates portions of the rotor core disposed inside the permanent-magnet cluster from other portions of the rotor core.

15. The rotor of claim 10, wherein:

a second end portion of the second cavity is disposed adjacent the outer perimeter of the rotor;

a second end portion of the third cavity is disposed adjacent the outer perimeter of the rotor;

a second end portion of the fourth cavity is disposed adjacent the outer perimeter of the rotor; and a second end portion of the fifth cavity is disposed adjacent the outer perimeter of the rotor.

16. The rotor of claim 10, wherein:

the second cavity has a second end portion;

the third cavity has a second end portion;

the fourth cavity has a second end portion;

the fifth cavity has a second end portion;

one or more of the first end portions and the second end portions of the first, second, third, fourth, and fifth cavities are vacant.

17. The rotor of claim 16, wherein each of the first and second end portions of each of the first, second, third, fourth, and fifth cavities are vacant.

18. The rotor of claim 1, wherein the first type of magnet material produces a greater quantity of magnetic flux per unit volume of magnet material than the second magnet material.

19. The rotor of claim 1, wherein the second type of magnet material is a type of magnet material more easily formed with curved surfaces than the first type of magnet material.

20. The rotor of claim 1, wherein the second type of magnet material is a type of magnet material that is more easily formed with curved surfaces than the first type of magnet material, and the first type of magnet material produces a greater quantity of magnetic flux per unit volume of magnet material than the second magnet material.

21. The rotor of claim 1, wherein the second type of magnet material is a type of magnet material that is more easily formed with curved surfaces than the first type of magnet material, and the first type of magnet material produces a greater quantity of magnetic flux per unit volume of magnet material than the second magnet material, such that the first permanent-magnet piece being the first type of magnet material promotes magnetic flux production.

22. The rotor of claim 1, wherein the second type of magnet material is a type of magnet material that is more easily formed with curved surfaces than the first type of magnet material, and the first type of magnet material produces a greater quantity of magnetic flux per unit volume of magnet material than the second magnet material, such that the combination of the first permanent-magnet piece being the first type of magnet material and the second permanent-magnet piece being the second type of magnet material promotes magnetic flux production, while suppressing the cost of the rotor.

* * * * *